United States Patent Office 3,419,412
Patented Dec. 31, 1968

3,419,412
PROCESS FOR COATING WITH EPOXY COMPOSITIONS
William C. Morris, Chagrin Falls, and Ronald J. Baran, Chardon, Ohio, assignors, by mesne assignments, to Kewanee Oil Company, Bryn Mawr, Pa., a corporation of Delaware
No Drawing. Filed Aug. 19, 1965, Ser. No. 481,093
12 Claims. (Cl. 117—38)

ABSTRACT OF THE DISCLOSURE

This invention comprises an organic composite coating on glass or other substrate, and the process of preparation, in which the coating is a mixture of pigment, a permanent carrier such as an epoxy resin, and a fugitive vehicle or carrier, the composite coating being deposited on the substrate at a temperature higher than that of the substrate, thereafter driving off the fugitive vehicle and curing the coating by heating at a temperature higher than that of the composite coating at the time of application, preferably the epoxy resin having a melting point of 75–85° C. and an epoxide equivalent of 550–700.

---

This invention relates to organic composite coatings on glass or similar substrates. These coatings are mixtures of: pigment, fixed or permanent carrier, and temporary or fugitive vehicle or carrier. The fixed or permanent carrier may be an epoxy resin or a modified epoxy resin. With or without a modifier the epoxy permanent material may be called an "epoxy resin." The temporary or fugitive vehicle may be a higher fatty alcohol. The color pigments (including black and white) are mixed with the fixed or permanent resins. With this mixture, we also mix the fugitive vehicle. The resulting mixture is then thoroughly mixed and brought to proper temperature. The substrate also is brought to proper temperature. The composite is then applied to the substrate, preferably by the hot screen process, but, if desired, by spraying, brushing, or the like.

The compositions according to the present invention are solid to semisolid at room temperature, melting at 40° C. to 60° C. They can be screen printed at 50° C. to 90° C. through a 165 to 235 mesh, heated decorating stencil or screen onto a glass or similar surface, e.g. a bottle or a tumbler. On contact with the colder surface, this composition freezes to a solid. Thus a second color can be immediately printed over the first color and this composition also freezes. The time can be as short as one to two seconds between such color application. The last color can be liquid at room temperature, and the word "solid" when used herein includes semisolid.

In the case of glass enamels of the prior art, there is an inorganic fixed vehicle for the color pigment and an organic fugitive vehicle. The mixture is applied to a cold substrate at a temperature near the freezing point of the composite whereupon the latter freezes. Another layer may be applied and the whole may then be fired, the volatile material being removed, and the inorganic vehicle remaining being melted to the substrate. In the case of the present invention, a novel feature is the use of the fixed organic material of suitable physical and chemical properties and the fugitive vehicle, the resulting coating being heat cured but not fired in the sense of the glass enamel vehicles of the prior art; that is, the heating is not so severe as in glass enameling and very much less severe than in the case of porcelain enameling.

Reference is made especially herein to the hot screen process since it is of commercial value and is in a field wherein the present invention can be embodied and its value realized in high degree. Notwithstanding the fact that the invention is best realized in connection with a hot screen process, it can be realized in some degree by applying the essential materials by brushing, stenciling, or spraying. The difference is mainly a question of the facility of application of the layers over the substrate.

The substrate is preferably glass but may be metal or synthetic or natural crystals, vitreous enameled surfaces, plastics, etc.

After all the colors are printed, directly or indirectly, on the substrate, it is heated to 165° C. to 265° C. for times ranging from 15 minutes to 45 minutes to cure, set, and bond the coating to the substrate. The resulting composite coating will be tough, scratch resistant, resistant to strong solvents and chemicals such as methyl-ethyl ketone, a strong solvent, and NaOH, a strong alkali, or the like.

The present invention contemplates the use of a tough organic compound, such as an epoxy resin with or without one or more modifiers such as a urea-formaldehyde type resin and/or an alkyd resin. The epoxy resin which is preferred has a melting point of 75° to 85° C. and an epoxide equivalent of 550 to 700. The modifier such as urea-formaldehyde, triazine-formaldehyde, and the like, should have a melting point of 60 to 64° C. The temperature of the composite when it is ready for application should be from 40 to 60° C.

For most uses of the invention a color will be an ingredient of the composition for color decoration but the invention will have some uses whether the color pigment is white, black, or the epoxy is without these colors and is water white. Yet, the color pigment will ordinarily be used. The choice by applicants of an organic permanent carrier for the color pigments instead of a glass will reduce the cost and in many cases will prove inadequate.

The composites according to the invention are adherent at proper temperature. A good test for adherence is intersecting scratch lines. After making the intersecting scratches, e.g. the letter "X" on the typewriter, a piece of Scotch tape is applied over it, pressed down firmly, and pulled away quickly. There should be no pigment adherent to the Scotch tape when the letter has been separated from the layer being tested. Scotch tape is thin, adhesive coated, plastic film.

EXAMPLE

| Material | First color, percent | Second color, percent | Limits, percent |
|---|---|---|---|
| Adol No. 65 | 5.5 | | 2–10 |
| Adol No. 54 | | 12.2 | 2–15 |
| Lorol No. 28 | 5.5 | | 2–10 |
| Lorol No. 7 | | 7.0 | 2–10 |
| Diphenyl | 4.0 | 7.0 | 2–10 |
| Hydrofol glyceride No. 200 | 20.0 | 10.0 | 0–20 |
| Ethyl cellulose Type N, 100 | 1.0 | 0.8 | 0.5–1.5 |

Melt and mix well at 90° C. until homogeneous, then add the following:

| Material | First color, percent | Second color, percent | Limits, percent |
|---|---|---|---|
| Epon 1002 | 30.0 | 29.0 | 27–35 |
| Uformite QR 336 Rohm & Haas | 30.0 | 29.0 | 10–30 |
| Amberlac D 96 | 4.0 | 5.0 | 4–18 |
| Total vehicle | 100.0 | 100.0 | |

Mix at 90° C. until melted and homogeneous and continue cooking for thirty minutes longer. To make a complete composition use:

| Material | First color, percent | Second color, percent | Limits, percent |
|---|---|---|---|
| R 100 Titania | 27.8 | | 25-34 |
| Ultramarine blue | 0.2 | | 0.1-0.3 |
| No. 90 Cadmium lithopone red. | | 25 | 25-33 |
| First color vehicle | 72.0 | | 66-75 |
| Second color vehicle | | 75.0 | 72-88 |
| Trioykyd | | 2.0 | 0-4 |
| M5 Cabosil | 2.0 | 1.8 | 1-2.5 |
| Total | 102.0 | 103.8 | |

Mix well, pass once through a 3-roll mill, freeze, and score.

When this material is to be used, it is heated to a proper temperature as indicated above and is then applied to the substrate. After application to the substrate, the coating is cured by heating from 15 to 45 minutes. The curing may be carried out at a temperature from 165° to 265° C., preferably 225° C. plus or minus 50°.

Adol 65 (ADM) is a commercial grade of stearyl alcohol. Adol 54 (ADM) is a technical grade of cetyl alcohol. Lorol No. 28 (Du Pont) is U.S.P. stearyl alcohol. Lorol No. 7 (Du Pont) is a technical dodecanol. Hydrofol glyceride 200 (ADM) is a hydrogenated castor oil wax. Ethyl cellulose (Hercules) N-100 (100 centipoise) N-type (47.5-49.0 ethoxyl).

Epon 1002 (Shell) is a solid epoxy resin having a melting point from 75° to 85° C. and an epoxy equivalent of 550 to 700 (grams of resin containing 1 gram-equivalent of epoxide). The structure of this epoxy resin may be represented by the following formula:

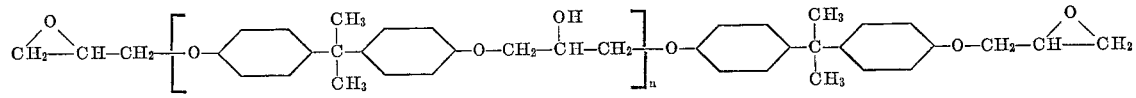

wherein $n$ is approximately 2.5–7. Uformite (QR336 (Rohm & Haas) is a modified maleic rosin type of resin having a melting point from 78° to 80° C. Cabosil (Cabot) is a finely divided silica used to control viscosity.

R-100 titania (Du Pont) is a pigment grade rutile titania. No. 90 cadmium lithopone red is a medium cadmium lithopone red pigment. Troykyd level aid (Troy) is an ionic type wetting and dispersing agent.

"ADM" refers to Archer-Daniels-Midland of Minneapolis, Minn., now known as "ADM." "Du Pont" refers to E. I. du Pont de Nemours & Co. of Wilmington, Del. "Hercules" refers to Hercules Powder Co. of Wilmington, Del. "Shell" refers to Shell Chemical Co. of San Francisco, Calif. "Rohm & Haas" refers to Rohm & Haas, Inc., Philadelphia, Pa. "Troy" refers to Troy Chemical Co., Newark, N.J. "Cabot" refers to The Cabot Corporation, Boston, Mass.

The above example can be varied in many ways. Adol 65, Adol 54, and Lorol 28 may be substituted by any fatty alcohol solid at 35° to 40° C., such as dihydroxy stearyl alcohols, arachidyl (C-20) and behenyl (C-22) alcohols, also solid polyethylene glycols and mixtures thereof, and biphenyl, naphthalene, p-terphenyl, and o-hydroxy-benzyl alcohols.

The hydrofol glyceride can be substituted by candella wax, carnauba wax, sugar cane wax, palm wax, Japan wax, and beeswax.

The ethyl cellulose may be substituted by ethyl hydroxy ethyl cellulose soluble in the wax or benzyl cellulose.

Epon 1002 can be substituted by other epoxy resins having epoxide value from 550 to 700 and being solid at room temperature.

Uformite QR336 can be substituted by any triazine formaldehyde resin solid at room temperature.

R-100 titania may be substituted by any inorganic pigment. Many other pigments and oxides may be used. Also, organic colors can be used in many cases to replace inorganic pigments in whole or in part.

The invention claimed is:
1. A process for applying a protective and decorative coating on a substrate comprising the steps of
 (A) forming an intimate liquid mixture of
  (1) an epoxy resin having a melting point from 75–85° C. and an epoxy equivalent of 550–700, said epoxy resin including a curing agent therefor operable under the influence of heat,
  (2) a fugitive vehicle selected from the group consisting of fatty alcohols having from 12–22 carbon atoms, hydrogenated glycerides, candella wax, carnauba wax, sugar cane wax, palm wax, Japan wax, beeswax, and mixtures thereof, said fugitive vehicle being present in sufficient quantity to render the mixture fluid at application temperatures, and
  (3) sufficient pigment to appropriately color said mixture,
 (B) applying said mixture at a temperature of 50–90° C. to a substrate which is at a temperature sufficiently below the freezing point of said mixture so that said mixture rapidly freezes upon application to said substrate, said applied mixture containing sufficient pigment to produce the appropriate color effect, sufficient epoxy resin to bond the pigment to the substrate on curing, and sufficient fugitive vehicle to temporarily but rapidly bond to epoxy resin and pigment to the substrate,
 (C) and thereafter heating said substrate to a temperature sufficient to vaporize and drive off the fugitive vehicle and cure the epoxy resin with which the pigment is intimately mixed.

2. The process of claim 1 wherein the said epoxy resin is modified by the addition thereto of from up to 35% of its weight of a urea-formaldehyde resin and from up to 20% of its weight of a fugitive solvent solid at room temperature.

3. The process as defined in claim 2 wherein further the said epoxy resin is modified by the addition thereto of up to 18% of its weight of an alkyd resin.

4. The process of claim 1 wherein the said epoxy resin is modified by the additon thereto of from up to 35% of its weight of a urea-formaldehyde resin and from up to 20% of its weight of a fugitive solvent solid at room temperautre, said fugiive solvent being a higher fatty alcohol.

5. A process for applying a protective and decorative coating on a substrate comprising the steps of
 (A) forming an intimate liquid mixture of
  (1) an epoxy resin having a melting point from 75–85° C. and an epoxy equivalent of 550–700, said epoxy resin including a curing agent therefor operable under the influence of heat,
  (2) a fugitive vehicle solid at room temperature selected from the group consisting of fatty alcohols having from 12–22 carbon atoms, hydrogenated glycerides, candella wax, carnauba wax, sugar cane wax, palm wax, Japan wax, beeswax, and mixtures thereof, said fugitive vehicle being present in sufficient quantity to render the mixture fluid at application temperatures, and
  (3) sufficient pigment to appropriately color said mixture,
 (B) applying said mixture at a temperature of 50–

90° C. to a substrate which is at a temperature sufficiently below the freezing point of said mixture so that said mixture rapidly freezes upon application to said substrate, said applied mixture containing sufficient pigment to produce the appropriate color effect, sufficient epoxy resin to bond the pigment to the substrate on curing, and sufficient fugitive vehicle to temporarily but rapidly bond the epoxy resin and pigment to the substrate, (C) repeating steps (A) and (B) as many times as desired to thereby form a multi-coated substrate of varying colors, (D) and thereafter heating said substrate to a temperature of at least 165° C. for sufficient time to fully vaporize and drive off the fugitive vehicle and cure the epoxy resin with which the pigment is intimately mixed.

6. The process of claim 5 wherein the said epoxy resin is modified by the addition thereto of from up to 35% of its weight to a urea-formaldehyde resin and from up to 20% of its weight of a fugitive solvent solid at room temperature.

7. The process as defined in claim 5 wherein further the said epoxy resin is modified by the addition thereto of up to 18% of its weight of an alkyd resin.

8. The process of claim 5 wherein the said epoxy resin is modified by the addition thereto of from up to 35% of its weight of a urea-formaldehyde resin and from up to 20% of its weight of a fugitive solvent solid at room temperature, said fugitive solvent being a higher fatty alcohol.

9. A process for applying a protective and decorative coating on a substrate comprising the steps of:

(A) forming an intimate liquid mixture of (1) an epoxy resin having a melting point from 75–85° C. and an epoxy equivalent of 550–700, said epoxy resin including a curing agent therefor operable under the influence of heat, (2) a fugitive vehicle solid at room temperature selected from the group consisting of fatty alcohols having from 12–22 carbon atoms, hydrogenated glycerides, candella wax, carnauba wax, sugar cane wax, palm wax, Japan wax, beeswax, and mixtures thereof, said fugitive vehicle being present in sufficient quantity to render the mixture fluid at application temperatures, (3) sufficient pigment to appropriately color said mixture, and (4) a filler material selected from the group consisting of ethyl cellulose, hydroxy ethyl cellulose and benzyl cellulose, (B) applying said mixture at a temperature of 50–90° C. by means of screen printing through a screen of 165 to 235 mesh to a substrate which is at a temperature sufficiently below the freezing point of said mixture so that said mixture rapidly freezes upon application to said substrate, said applied mixture containing sufficient pigment to produce the appropriate color effect, sufficient epoxy resin to bond the pigment to the substrate on curing, and sufficient fugitive vehicle to temporarily but rapidly bond the epoxy resin and pigment to the substrate, (C) repeating steps (A) and (B) as many times as desired to thereby form a multi-coated substrate of varying colors, (D) and thereafter heating said substrate to a temperature in the approximate range of 165 to 265° C. for at least about 15 minutes, such being sufficient to vaporize and drive off the fugitive vehicle and cure the epoxy resin with which the pigment is intimately mixed which is thus bonded firmly to the substrate.

10. The process of claim 9 wherein the said epoxy resin is modified by the addition thereto of from up to 35% of its weight of a urea-formaldehyde resin and from up to 20% of its weight of a fugitive solvent solid at room temperature.

11. The process as defined in claim 9 wherein further the said epoxy resin is modified by the addition thereto of up to 18% of its weight of an alkyd resin.

12. The process of claim 9 wherein the said epoxy resin is modified by the addition thereto of from up to 35% of its weight of a urea-formaldehyde resin and from up to 20% of its weight of a fugitive solvent solid at room temperature, said fugitive solvent being a higher fatty alcohol.

References Cited

UNITED STATES PATENTS

| | | | |
|---|---|---|---|
| 2,591,539 | 4/1952 | Greenlee | 260—834 X |
| 2,713,569 | 7/1955 | Greenlee | 117—161 X |
| 2,850,475 | 9/1958 | Greenlee | 260—834 |
| 3,089,782 | 5/1963 | Bush et al. | 117—38 |

WILLIAM D. MARTIN, *Primary Examiner.*

MATHEW R. P. PERRONE, JR., *Assistant Examiner.*

U.S. Cl. X.R.

117—46, 119.2, 124, 132, 161; 260—28, 33.4, 834, 835